US00RE45144E

(19) United States
(12) Reissued Patent
Shore et al.

(10) Patent Number: US RE45,144 E
(45) Date of Reissued Patent: Sep. 23, 2014

(54) MULTI-LAYER SOUND ATTENUATING ACOUSTIC PANEL

(71) Applicant: VTI Architectural Products, Inc., Holstein, IA (US)

(72) Inventors: Craig Shore, Grinnell, IA (US); Ralph Scheidecker, Clarksville, IA (US); Nathan Anderson, Clarksville, IA (US); Robert Scheidecker, Clarksville, IA (US); Curtis Carroll, Ankeny, IA (US)

(73) Assignee: VTI Architectural Products, Inc., Holstein, IA (US)

(21) Appl. No.: 14/103,979

(22) Filed: Dec. 12, 2013

Related U.S. Patent Documents

Reissue of:
(64) Patent No.: 8,074,766
Issued: Dec. 13, 2011
Appl. No.: 12/876,455
Filed: Sep. 7, 2010

U.S. Applications:
(60) Provisional application No. 61/276,057, filed on Sep. 8, 2009.

(51) Int. Cl.
*E04B 1/84* (2006.01)

(52) U.S. Cl.
USPC ..... 181/290; 181/285; 52/144

(58) Field of Classification Search
USPC ..... 181/285, 290, 294; 52/144, 145
See application file for complete search history.

(56) References Cited

U.S. PATENT DOCUMENTS

| | | | |
|---|---|---|---|
| 4,446,663 | A | 5/1984 | Stumpf et al. |
| 4,487,793 | A | 12/1984 | Haines et al. |
| 4,488,619 | A | 12/1984 | O'Neill |
| 4,621,709 | A | 11/1986 | Naslund |
| 5,009,043 | A | 4/1991 | Kurrasch |
| 5,094,318 | A | 3/1992 | Maeda et al. |
| 5,258,585 | A | 11/1993 | Juriga |
| 5,416,285 | A | 5/1995 | Niehaus |
| 5,424,497 | A | 6/1995 | Dias et al. |
| 5,483,028 | A | 1/1996 | Holwerda |
| 5,723,831 | A | 3/1998 | Martin et al. |
| 6,158,176 | A | 12/2000 | Perdue |
| 7,181,891 | B2 | 2/2007 | Surace et al. |
| 2006/0124388 | A1 | 6/2006 | Pompei |
| 2008/0073146 | A1 | 3/2008 | Thompson et al. |
| 2008/0264721 | A1 | 10/2008 | Tinianov et al. |

*Primary Examiner* — Jeremy Luks
(74) *Attorney, Agent, or Firm* — Simmons Perrine Moyer Bergman PLC

(57) ABSTRACT

An acoustic panel having rigid, damped faces and an interior layer assembly. The assembly can constructed with minimal layer coupling and common construction adhesives and without the use of mechanical fasteners. The panel is capable of providing significant noise attenuation while maintaining sufficient structural rigidity such that the panel is suitable for a broad range of construction applications.

20 Claims, 3 Drawing Sheets

MULTI-LAYER SOUND ATTENUATING ACOUSTIC PANEL

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the benefit of U.S. Provisional Application No, 61/276,057 filed on Sep. 8, 2009 by the same inventors, entitled "Acoustic panel".

BACKGROUND

As noise pollution becomes an increasing problem, the need for effective sound attenuating panels also grows. Additionally, the demand for sound attenuating panels that are lighter in weight, economical, and made from environmentally responsible materials is also increasing. In the past materials such as lead have been used to achieve high noise attenuation. However, these materials have significant environmental and manufacturing drawbacks and designs using such materials can often be complicated in their construction. The disclosed invention provides a unique design that meets the performance demands of noise attenuating panels without the use of problematic materials and complicated construction.

BACKGROUND OF THE INVENTION

A variety of designs have been proposed in the past for acoustic panel assemblies. It is often the intent of these assemblies to restrict the transmission of sound through the use of materials with high damping, or to reduce sound transmission by decoupling two sides of the assembly. It is also an advantage if such acoustic panels are structurally rigid as the demands of modern construction often require acoustic panels to bear a load.

U.S. Pat. No. 7,181,891 details a design that relies primarily on layered damping materials for acoustic attenuation performance. In this invention, a viscoelastic adhesive is used to bind together layers of material. The viscoelastic adhesive itself is chosen for its damping abilities, and it is used within a layered assembly of other materials to achieve the desired acoustical attenuation. It is also of note that the current cost of the type of damping adhesive detailed in U.S. Pat. No. 7,181,891 is typically significantly higher than common construction adhesives.

U.S. Pat. No. 5,416,285 details a design where a significant effort has been made to decouple layers of the assembly, or at least make sound transmission paths indirect and inefficient. In this invention, a variety of layers, or plies, with differing geometric configurations are used to achieve sound attenuation. The invention also makes use of spacers. These spacers act to reduce sound transmission by reducing the direct transmission paths through the panel structure and adding sound absorbing dead air spaces.

Both of these designs while effective in certain applications also suffer from inherent weaknesses. For the invention outlined in U.S. Pat. No. 7,181,891 since each layer is bonded together with the adhesive there results a strong mechanical coupling between each layer thus providing a direct path for sound travel. While the use of a viscoelastic adhesive can reduce this effect and increase sound absorption, it is impossible to completely negate the effect material layers are directly adhered. For the invention outlined in U.S. Pat. No. 5,416,285 dead air spaces can reduce sound transmission; however the design still requires each later to adhered together, thus adding to the coupling of the layers and allowing more sound to transmit. In addition, the design does not allow for unique materials that could add acoustic performance. Given the weakness of current designs a new approach is warranted.

SUMMARY OF THE INVENTION

The invention achieves high sound attenuation with structural strength through the use of certain materials with given properties in a unique layered panel configuration. This is accomplished by the inherent sound attenuating properties of each material component of the assembly and by inducing specific properties into specific components themselves prior to assembly. Finally, the assembly can be constructed without the use of costly mechanical fasteners, and with the use of common economical adhesives in specific areas such that only minimal coupling of the material layers is seen.

The final layered panel assembly will yield the desired acoustic properties and significant structural rigidity.

(1) Structural face, which may be oriented strand board (2) Damping layer, which may be mass loaded vinyl (3) Formed variable density panel, which may be compression formed natural fiber composite (4) Non-flammable gypsum layer, which may be Sheetrock®

Figure 3:
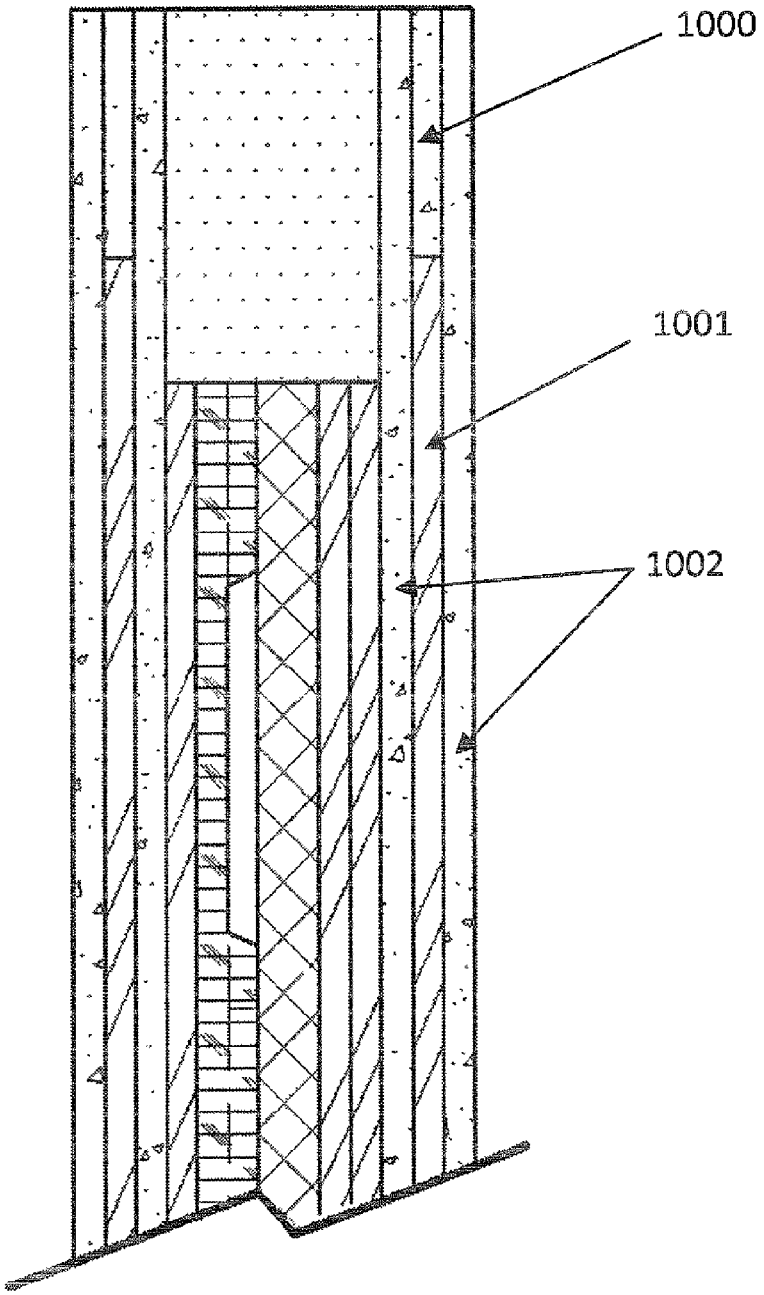

(5) Structural frame, which may be laminated strand lumber (6) Low density region (7) High density region The following reference numerals are used to indicate the parts and environment of the invention in the drawings of FIG. 3.

Figure 4:
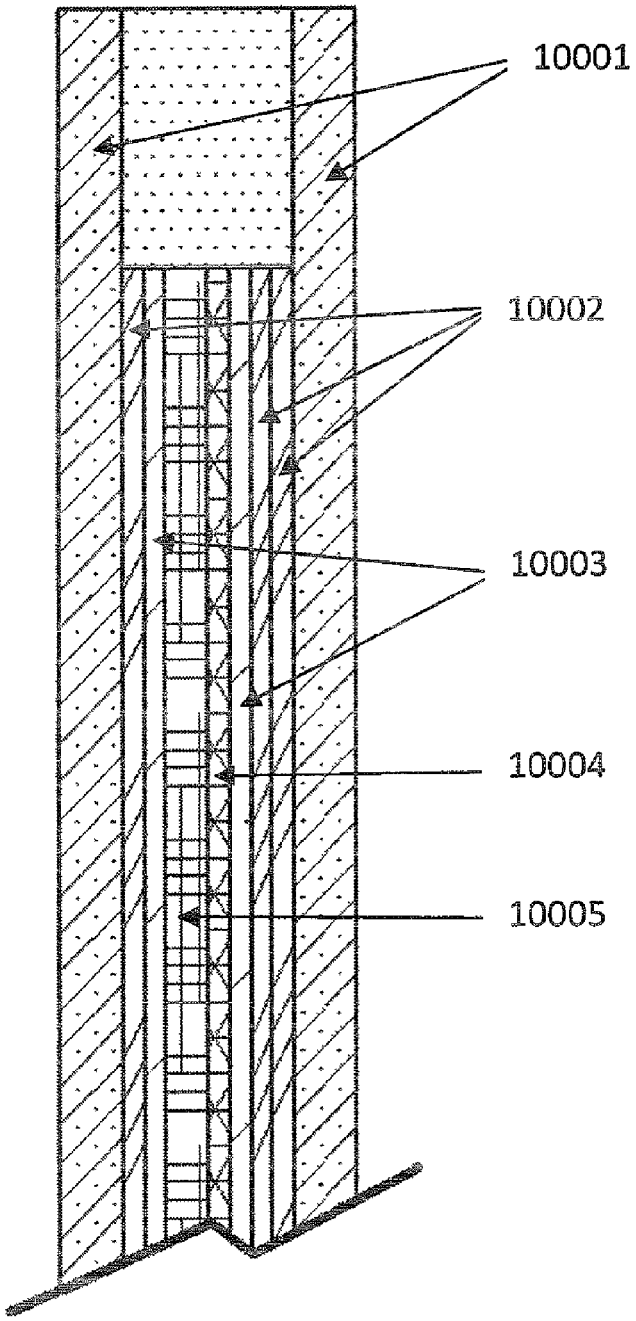

(1000) Perimeter frame, which may be high density fiberboard (1001) Face damping layer, which may be mass loaded vinyl (1002) High density structural facing, which may be high density fiberboard The following reference numerals are used to indicate the parts and environment of the invention in the drawings of FIG. 4.

(10001) Structural face, which may be oriented strand board (10002) Damping layer, which may be mass loaded vinyl (10003) High density fiber panel which may be, high density fiberboard (10004) Non-flammable fiber layer, which may be kaowool (10005) Low density fiber layer, which may be nonwoven cotton batting

DETAILED DESCRIPTION OF THE INVENTION AND EMBODIMENTS

Certain properties will affect the ability of a material or assembly to attenuate sound and vibration. Such properties may include density, porosity, rigidity and others. In order to attenuate sound and achieve high levels of transmission loss materials with appropriate properties must be carefully chosen. For maximum performance the materials must be assembled in a manner that promotes attenuation.

The invention accomplishes both of these criteria through the unique use of both sound attenuating materials and a unique configuration. The foundation of the invention lies in the use of rigid, damped facing layers around a tunable core configured for both sound reverberation absorption and transmission loss. The complete assembly is characterized also as having minimal rigid coupling between the layers.

The invention can be understood through the review and several preferred embodiments. It is understood that these embodiments are not exhaustive of how the invention could be configured, but do serve to illustrate the invention.

Variable Density Formed Panel Construction

Figure 1:
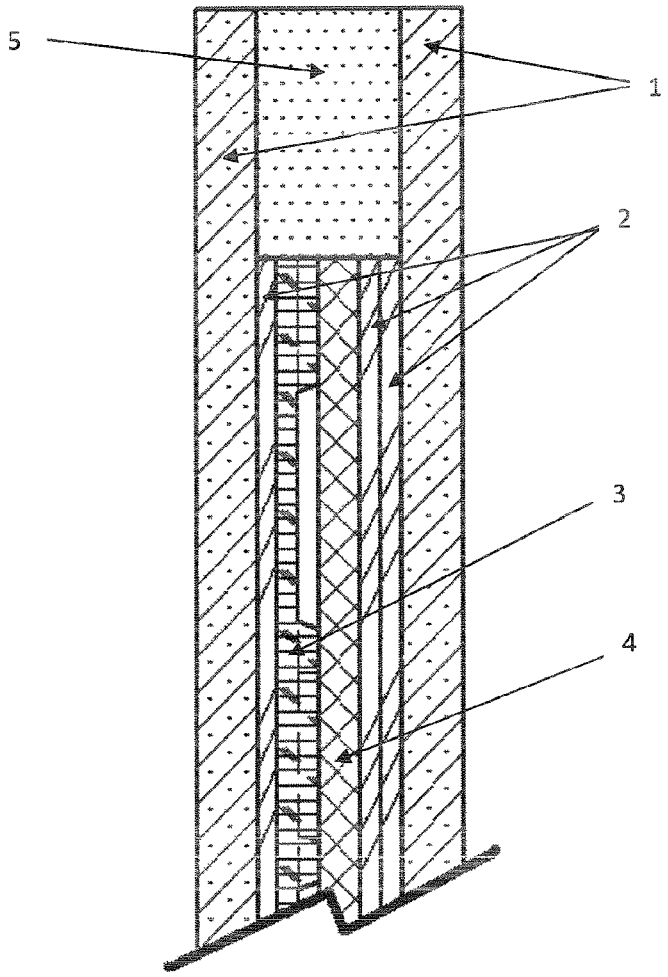
FIG. 1 Section detail drawing of the acoustic panel assembly as described in the first preferred embodiment FIG. 2 Formed acoustic panel FIG. 3 Section detail drawing of the acoustic panel assembly as described in the first preferred embodiment with face damping assembly FIG. 4 Enlarged section detail drawing of the acoustic panel assembly as described in the second preferred embodiment The following reference numerals are used to indicate the parts and environment of the invention in the drawings of FIG. 1 and FIG. 2.

FIG. 1 shows a sectioned view of the basic assembly an embodiment of the present invention. The outer layers (1) comprise oriented strand board chosen primarily for its rigidity. Other suitable materials could be plywood, medium density fiberboard or similar. Such materials are also acoustically reflective and provide a familiar interface for bonding facing, veneers or other materials per the final application. Beneath these faces, is a mass loaded vinyl (trade name Barymat®) sound damping material (2). This layer works to reduce sound transmission by providing improved damping to the outer faces of the assembly. In addition, at certain frequencies increasing the mass of a panel will increase sound attenuation. Since the barymat is of higher density than the OSB and other materials in the assembly, it provides an efficient means of increasing overall mass. As shown, the material (2) can be used in multiple layers to increase the mass of the assembly for this affect. The material (3) comprises a compression formed fiber composites panel. Specifically, the panel is a natural fiber, such as jute, mated with a polymer binder, such as polypropylene. During a hot compression forming process the panel is pressed such that it has regular areas of alternating low and high density. Since low density fibrous composites can reduce noise by reducing reverberation within a cavity, and since high density materials have improved transmission loss, a combination of high density and low density regions are formed within the panel. The resulting panel with its combinations of density and varying geometry transmits vibration inefficiently, yielding the desired sound attenuation.

Figure 2:
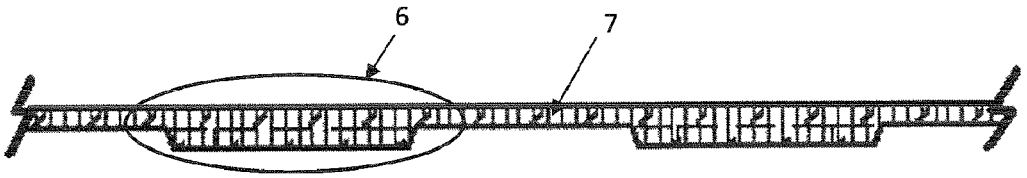

A standalone view of the formed composites panel is shown in FIG. 2. The formed panel is characterized by low density nodes (6) formed on and within high density regions (7). Due to the varying density of the panel, the resulting layer will good transmission loss in the high density area (6) as well as reverberation absorption and assembly layer decoupling through the use of the low density nodes (6). It should be noted that by manipulation of the density distribution of the panel and the geometry of the nodes shown in FIG. 2 the acoustic properties of the material can be further manipulated.

The last core material of FIG. 1, (4) is a rigid gypsum layer, tradename Sheetrock®. Typically used for wall assemblies, gypsum board works well as a sound attenuating barrier, provides protection against fire where such performance is warranted for certain building applications, and is relatively rigid. It is important to note that the gypsum layer (4) only contacts the formed panel layer (3) at the low density nodes. Since low density, fibrous materials inefficiently transmit vibration; sound will not have an efficient direct path between these layers. In other words, this low density contact will work to promote decoupling of the two layers resulting in sound attenuation. The geometry shown in FIG. 2 also creates dead air spaces between the formed panel (3) and layer (4) further improving acoustical attenuation.

The final component of this embodiment, shown in FIG. 1, is an outer structural frame made of laminated strand lumber (5). This frame works to constrain layers (2), (3), and (4). With the use of this frame, the only adhesive required for the full assembly is that which is used to bond the facing layer (1) to the frame (5). Unlike previous inventions which bond multiple layers, this frame allows for a secure assembly with loose uncoupled layers within to increase acoustic attenuation though layer decoupling.

An additional embodiment of the assembly shown in FIG. 2 could include an alternate design of the facing (1), shown in FIG. 1. The performance of the panel shown in FIG. 1 can be improved by incorporating a damping material layer within the face. This can be done by replacing the OSB with a unique sandwich construction assembly. The resulting assembly is shown in FIG. 3. Here (1001) is the same mass loaded vinyl as (4) and is sandwiched between layers of high density fiberboard, (1002). The outer layers (1002) of this facing assembly would provide the strength needed for use of the assembly in structural applications while (1001) within would increase damping of the face and thus improve overall attenuation of a panel assembly like that shown in FIG. 1. A perimeter frame, (1000), of similar material as (1002) is used to adhere the laces together eliminating the need for gluing the mass loaded material to the frame and thus increasing acoustic performance by keeping the layered material decoupled.

Decoupling Fiber Layer Construction

The present invention could also be configure to accomplish layer decoupling and sound attenuation through a unique fiber filled decoupling assembly. FIG. 4 shows the nature of this assembly. In this embodiment, material layers (10001) and (10002) are the same as (1) and (2) from FIG. 1. However, with this configuration the compression formed fiber composite panel (3) and gypsum layer (4) of FIG. 1 have been replaced with (10003), (10004), and (10005). Layers, (10003), are composed of a compression formed high density flat fiber panel that works to block sound in a similar fashion as the high density regions, (7), shown in FIG. 2. Between these layers are two fiber layers (10004) and (10005). (10004) comprises a nonwoven ceramic fiber insulation, kaowool, with (10005) being a non-woven cotton batting blanket. Both layers exhibit a significant degree of compressibility and extremely low rigidity, thus creating a planar reverberation absorptive layer and decoupling layers (10003) preventing the direct transmission of vibration. The kaowool is of differing density than the cotton batting since multiple materials and differing densities is found to have higher noise attenuation than a single layer. It has also been found that the level of compression in layers (10004) and (10005) will affect the noise attenuation thus allowing the designer to control the performance of the assembly. This core configuration could also be constructed with the facing materials (10001) in FIG. 4 replaced with the damping face assembly of (1000), (1001), and (1002) shown in FIG. 3.

We claim:

1. An acoustic panel having a top frame end, a right side and a left side, the acoustic panel comprising:

a. First and second parallel rigid outer layer structural face panel members, each being spaced apart and having an outer layer density characteristic and an outer layer acoustic reflectivity characteristic and an outer layer sound transmission characteristic;

b. A structural frame member disposed between and at said top frame end of said first and second parallel rigid outer layer structural face panel members, c. In a space located between said first and second parallel rigid outer layer structural face panel members, which is not occupied by said structural frame member; a multi-layer outer core comprising:

i. A plurality of parallel outer core damping layers, each being spaced apart from at least another of said plurality of parallel outer core damping layers and having an outer core density characteristic which is higher than said outer layer density characteristic and an outer core acoustic reflectivity characteristic which is [lower] *different* than said outer layer acoustic reflectivity characteristic and an outer core sound transmission characteristic which is lower than said outer layer sound transmission characteristic;

ii. In a space between at least two of said plurality of outer core damping layers, a multi-layer rigid inner core comprising:

a. A formed fiber composite layer with varying geometry and density having a planar first side which is parallel to an outer surface of said plurality of outer core damping layers and having an irregular thickness dimension; where areas of larger thickness have a lower density than areas having a smaller thickness; and b. A substantially planar panel contacting said formed fiber composite layer only at areas thereon with a lower density and a larger thickness.

2. The acoustic panel of claim 1 wherein said substantially planar panel consists essentially of gypsum.

3. The acoustic panel of claim 1 wherein said plurality of parallel outer core damping layers comprises two substantially identical adjacent panels.

4. The acoustic panel of claim 1 wherein said plurality of parallel outer core damping layers comprises layers of [beryllium] loaded vinyl.

5. A panel of claim 1 wherein said first and second parallel rigid outer layer structural face panel members comprise oriented strand board.

6. A panel of claim 1 wherein said first and second parallel rigid outer layer structural face panel members comprise plywood.

7. A panel of claim 1 wherein said first and second parallel rigid outer layer structural face panel members comprise medium density fiber board.

8. The acoustic panel of claim 1 wherein said outer layer density characteristic is substantially homogeneous in a first direction and discontinuous in an orthogonal second direction.

9. The acoustic panel of claim 1 wherein said outer layer density characteristic is discontinuous.

10. The acoustic panel of claim 9 where said outer layer density characteristic has a central zone with a center zone density characteristic which is discontinuous from a plurality of opposing outer zone density characteristics.

11. An acoustic panel having a top frame end, a right side and a left side, the acoustic panel comprising:

first and second outer layer structural face panel members, each being spaced apart and having an outer layer density characteristic and an outer layer acoustic reflectivity characteristic and an outer layer sound transmission characteristic;

a structural frame member disposed between and at said top frame end of said first and second outer layer structural face panel members, in a space located between said first and second outer layer structural face panel members, which is not occupied by said structural frame member; a multi-layer outer core comprising:

a plurality of outer core damping layers, each being spaced apart from at least another of said plurality of outer core damping layers and having an outer core density characteristic which is higher than said outer layer density characteristic and an outer core acoustic reflectivity characteristic which is lower than said outer layer acoustic reflectivity characteristic and an outer core sound transmission characteristic which is lower than said outer layer sound transmission characteristic;

in a space between at least two of said plurality of outer core damping layers, a multi-layer rigid inner core comprising:

a formed fiber composite layer with varying geometry and density having a planar first side which is parallel to an outer surface of said plurality of outer core damping layers and having an irregular thickness dimension; where areas of larger thickness have a lower density than areas having a smaller thickness; and a substantially planar panel contacting said formed fiber composite layer only at areas thereon with a lower density and a larger thickness.

*12. An acoustic panel having a top frame end, a right side and a left side, the acoustic panel comprising:*

*First and second outer layer structural face panel members, each being spaced apart and having an outer layer density characteristic and an outer layer acoustic reflectivity characteristic and an outer layer sound transmission characteristic;*

*A structural frame member disposed between and at said top frame end of said first and second outer layer structural face panel members,*

*In a space located between said first and second outer layer structural face panel members, which is not occupied by said structural frame member; a multi-layer outer core comprising:*

*A first layer which is a damping layer, having an outer core density characteristic which is different from said outer layer density characteristic and an outer core acoustic reflectivity characteristic which is different from said outer layer acoustic reflectivity characteristic and an outer core sound transmission characteristic which is different from said outer layer sound transmission characteristic;*

*In a space between said first and second outer layer structural face panel members a multi-layer inner core comprising:*

*A second layer which is a layer with varying geometry on a side and varying density; and*

*A panel contacting said second layer only at areas thereon with a larger thickness.*

*13. The acoustic panel of claim 12 wherein first and second outer layer structural face panel members are parallel and rigid.*

*14. The acoustic panel of claim 12 wherein said first layer which is a damping layer, is one of a plurality of outer core damping layers, each being spaced apart from at least another of said plurality of outer core damping layers and having an outer core density characteristic which is higher than said outer layer density characteristic and an outer core acoustic reflectivity characteristic which is lower than said outer layer acoustic reflectivity characteristic an outer core sound transmission characteristic which is lower than said outer layer sound transmission characteristic.*

*15. The acoustic panel of claim 12 wherein said multi-layer inner core is disposed in in a space between said first and second outer layer structural face panel members and further within a space between said at least two of plurality of outer core damping layers.*

*16. The acoustic panel of claim 12 wherein said second layer is a formed fiber composite layer.*

*17. The Acoustic panel of claim 12 wherein said panel is a substantially planar panel.*

*18. The acoustic panel of claim 14 wherein said multi-layer inner core is disposed in in a space between said first and second outer layer structural face panel members and further within a space between said at least two of plurality of outer core damping layers.*

*19. The acoustic panel of claim 18 wherein said second layer is a formed fiber composite layer.*

*20. The Acoustic panel of claim 19 wherein said panel is a substantially planar panel.*

* * * * *